United States Patent
Shimada et al.

(10) Patent No.: US 11,590,683 B2
(45) Date of Patent: Feb. 28, 2023

(54) MOLDING PRODUCTION METHOD, MOLDING DIE, MOLDING PRODUCTION APPARATUS, BURR REMOVAL METHOD, AND BURR REMOVAL DEVICE

(71) Applicant: KYORAKU CO., LTD., Kyoto (JP)

(72) Inventors: Kengo Shimada, Yamato (JP); Tadatoshi Tanji, Yamato (JP); Naoto Tani, Nagoya (JP); Masaaki Onodera, Nagoya (JP)

(73) Assignee: KYORAKU CO., LTD., Kyoto (JP)

( * ) Notice: Subject to any disclaimer, the term of this patent is extended or adjusted under 35 U.S.C. 154(b) by 225 days.

(21) Appl. No.: 16/758,617

(22) PCT Filed: Oct. 30, 2018

(86) PCT No.: PCT/JP2018/040361
§ 371 (c)(1),
(2) Date: Apr. 23, 2020

(87) PCT Pub. No.: WO2019/088115
PCT Pub. Date: May 9, 2019

(65) Prior Publication Data
US 2021/0178653 A1   Jun. 17, 2021

(30) Foreign Application Priority Data

Oct. 31, 2017 (JP) .............................. JP2017-210994
Dec. 12, 2017 (JP) .............................. JP2017-237467
Oct. 26, 2018 (JP) .............................. JP2018-201484

(51) Int. Cl.
*B29C 49/50* (2006.01)
*B29C 37/02* (2006.01)
(Continued)

(52) U.S. Cl.
CPC .............. *B29C 49/50* (2013.01); *B29C 37/02* (2013.01); *B29K 2023/06* (2013.01); *B29K 2023/12* (2013.01); *B29L 2031/3032* (2013.01)

(58) Field of Classification Search
CPC ..... B29C 49/4273; B29C 49/50; B29C 49/70; B29C 37/02; B29C 2049/701;
(Continued)

(56) References Cited

U.S. PATENT DOCUMENTS 3,303,243 A   2/1967 Hughes et al.
3,606,113 A   9/1971 Lichtman
(Continued)

FOREIGN PATENT DOCUMENTS

CN   203844208 U   9/2014
JP   61-148025 A   7/1986
(Continued)

OTHER PUBLICATIONS

International Search Report dated Jan. 29, 2019 of corresponding International Application No. PCT/JP2018/040361; 2 pgs.
The extended European Search Report dated Oct. 29, 2020, in connection with corresponding EP Application No. 18873254.9; 7 pages.

*Primary Examiner* — Monica A Huson
(74) *Attorney, Agent, or Firm* — Maier & Maier, PLLC

(57) ABSTRACT

A molding-forming method, a molding mold, and a molding production apparatus with which efficient burrs removal is possible without requiring a large apparatus. A molding production method includes, in addition to a molding being formed inside a mold, burrs formed around the molding are separated from the molding. After formation of the molding, air is blown inside the mold on at least a portion of the burrs formed around the molding to cool the same, a projecting member is projected toward the cooled burrs, and the burrs are separated from the molding. After pressing the burrs toward the projecting member by the air blowing, the burr (Continued)

is pressed toward the mold surface facing the projecting member by projection of the projecting member to separate the burr from the molding.

18 Claims, 16 Drawing Sheets

(51) Int. Cl.
  *B29K 23/00* (2006.01)
  *B29L 31/30* (2006.01)
(58) Field of Classification Search
  CPC ...... B29C 2049/503; B29C 2049/4807; B29C 2793/0027; B29C 2793/009; B29C 2049/725; B29C 2793/0009; B29C 2049/704; B29C 49/04; B29L 2023/22; B29L 2031/3032; B29K 2023/12; B29K 2023/06
  See application file for complete search history.

(56) References Cited

U.S. PATENT DOCUMENTS

| | | | |
|---|---|---|---|
| 4,816,093 A | * | 3/1989 | Robbins, III ........... B29C 49/50 156/244.14 |
| 5,967,010 A | | 10/1999 | van Manen |
| 2002/0180116 A1 | * | 12/2002 | Weeks .................... B29C 49/56 425/527 |

FOREIGN PATENT DOCUMENTS

| | | |
|---|---|---|
| JP | H04-60612 U | 5/1992 |
| JP | 2002-292642 A | 10/2002 |
| JP | 2007-276125 A | 10/2007 |
| JP | 2009-101412 A | 5/2009 |
| JP | 2016-83859 A | 5/2016 |

* cited by examiner

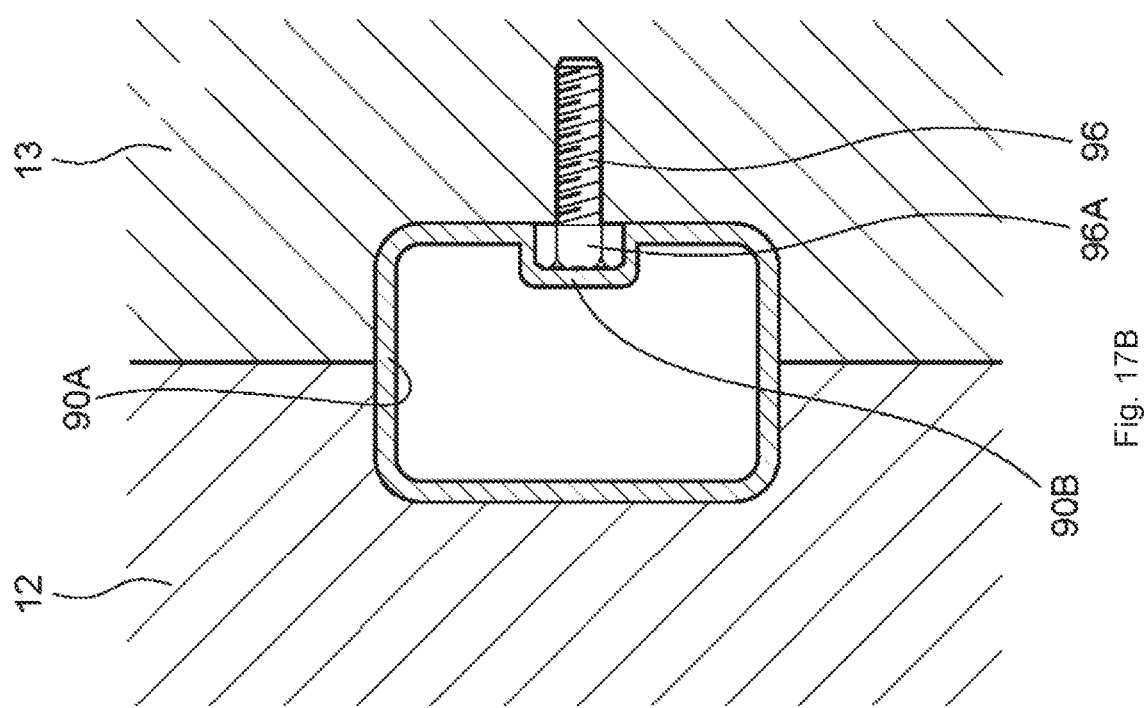
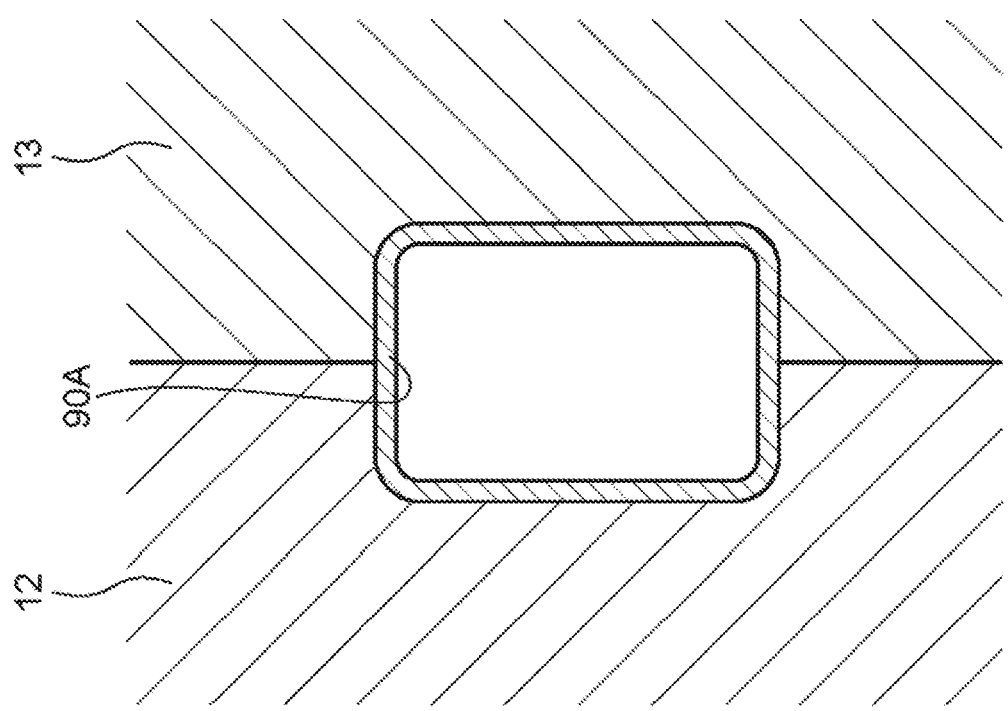

MOLDING PRODUCTION METHOD, MOLDING DIE, MOLDING PRODUCTION APPARATUS, BURR REMOVAL METHOD, AND BURR REMOVAL DEVICE

TECHNICAL FIELD

The present invention relates to a method for manufacturing molded body, a mold for molding, a manufacturing apparatus for a molded body, and more particularly to a novel method for manufacturing a molded body in a way that removal of a burr is performed in molds, and to a mold for molding and a manufacturing apparatus for a molded body used in that method. Furthermore, the present invention relates to a burr removal method and a burr removal apparatus capable of efficiently performing removal of a burr on a molded body such as an air conditioning duct of an automobile.

BACKGROUND ART

As a molded body formed by molding a resin material, for example, various air-conditioning duct mounted in an instrument panel of an automobile is known. These air conditioning duct can be easily produced by blow molding a parison extruded from a die of an extruder.

On a molded body (i.e. duct) subjected to blow molded body, a burr is formed around the clamped mold, and burr removal process is essential. In general, removal of the burr after blow molding is often performed using a press machine, and the burr around the mold is collectively removed by punching out the burr using a die corresponding to the outer shape of the molded body.

For example, Patent Literature 1 discloses a blow molding method and a blow molding apparatus for performing blow molding in molds. It is described that the cooling efficiency of the burr is improved by positively contacting the burr with the mold. In blow molding, the burr is punched out by a press machine after the burr is sufficiently cooled, which causes a large loss time and is a factor that impairs productivity. According to the technique described in Patent Literature 1, the time required for a series of step from blow molding to removal of the burr become short, and productivity is improved.

CITATION LIST

Patent Literature

Patent Literature 1: Japanese Patent Publication No. 2016-83859

SUMMARY OF INVENTION

Technical Problem

By the way, not only in blow molding but also in molding in which a burr is formed around a molded body, it is fundamental that the removal operation of a burr is performed by a press machine or manual work after removing the molded body from molds. For example, the invention described in Patent Literature 1 is not the exception. However, when removal of a burr is performed using a press machine, if the size of the molded body is large, the press machine must be correspondingly increased in size, and a large capital investment is required. Further, if the size and shape of the molded body are different, it is necessary to change the size and shape of the press machine corresponding to that, which further increases the capital investment.

From such a situation, in particular, in molding a large-sized molded body, a burr formed around the molded body is manually cut off. Specifically, the method is basically in which a molded body is taken out from molds with burr attached, and thereafter, knife treatment or the like is manually performed. In the method of removing burr one by one from a large molded body manually, the burr treatment is performed after the molded body is removed from the molds. As a result, it takes a lot of process time, and a lot of time required to remove a burr per molded body, which is a factor that greatly impairs productivity.

The present invention has been proposed in view of such conventional circumstances, and an object of the present invention is to provide a method for manufacturing molded body capable of performing efficient burr removing without requiring a large-scale apparatus. Further an object of the present invention is to provide a mold for molding and a manufacturing apparatus for a molded body. Another object of the present invention is to provide a burr removal method capable of efficiently removing burr without requiring a large-scale device, and further an object of the present invention is to provide a burr removal apparatus.

Solution to Problem

In order to achieve the above-mentioned object, the first invention of the present application provides a method for manufacturing a molded body, the method comprising the steps of molding a molded body in molds, and separating a burr formed around the molded body, wherein the burr is separated from the molded body by, within the molds, cooling at least a part of the burr, and projecting at least one projecting member against the cooled burr.

Further, provided is a mold for molding a molded body, comprising a space for accommodating a burr provided outside a pinch portion for pinching an outer peripheral portion of a molded body, an air blowing mechanism blowing air toward the space, and a projecting member projecting into the space.

Further, provided is a manufacturing apparatus for a molded body, the apparatus comprising molds, and configured to mold a molded body in the molds, and separating a burr formed around the molded body, wherein the molds comprise an air blowing mechanism performing air blow to at least a part of a burr formed around a molded body in order to cool the burr, and a projecting member projecting against the cooled burr in order to separate the burr from the molded body.

The present invention is based on the idea that removing a burr is performed in molds, and the burr is cooled by air blow and the burr is separated by a projecting member. Thereby, efficiently burr removal is realized.

The second invention of the present application provides a burr removal method for removing a burr formed along a parting line of a molded body taken out of molds, comprising placing a molded body on a receiving base, and supporting the burr at a position outside a contact position of press jig when the burr is pressed by the press jig in the vicinity of a parting line. Further provided is a burr removal apparatus for removing a burr formed along a parting line of a molded body taken out of molds, comprising a press jig for pressing the burr near the parting line, a first receiving base on which a molded body is placed at the time of pressing by the press jig, and a second receiving base for supporting a position outside the contact position of the burr and press jig.

When pressing a burr with the press jig near the parting line, by placing the molded body on the receiving base, and by supporting the position outside the contact position of the burr and press jig, this portion becomes the fulcrum. Thereby, the force of the press jig is effectively applied at the contact point of the press jig, which is the point of action, and the burr is easily punched.

Further, provided is a burr removal method for removing a burr formed along a parting line of a molded body taken out of molds, comprising pressing the burr near the parting line with a rod-shaped press jig, and separating the burr from the molded body.

Further, provided is a burr removal apparatus for removing burr formed along a parting line of a molded body taken out of molds, comprising a rod-shaped press jig for pressing the burr near the parting line.

The Rod-shaped press jig can remove a burr, for example, by being arranged around the molded body, and can handle molded body of any size. Further, it is possible to cope with a change in the shape of the molded body only by changing the installation position of the rod-shaped press jig.

Effect of the Invention

According to the present invention, removing a burr is efficiently performed without requiring a large-scale apparatus. In particular, according to the present invention, when the molded body is taken out after the molding, the burr treatment is completed, and it is possible to realize a significant rationalization of the molding process. Further, it is possible to easily cope with the change about the size or shape of molded body.

BRIEF DESCRIPTION OF THE DRAWINGS

FIGS. 17A and 17B are diagrams showing a molded state of a disposal bag portion of a molded body, wherein FIG. 17A is a molded state when locking tool is not installed, and FIG. 17B is a molded state when a locking tool is installed.

DESCRIPTION OF EMBODIMENTS

Hereinafter, embodiments of the present invention will be described in detail with reference to the drawings.

(1) First Embodiment

In the first embodiment, an embodiment of a method for producing a molded body, a mold for molding, and a manufacturing apparatus for molded body to which the present invention is applied will be described in detail with reference to the drawings, taking blow molding of a duct as an example.

Figure 1:
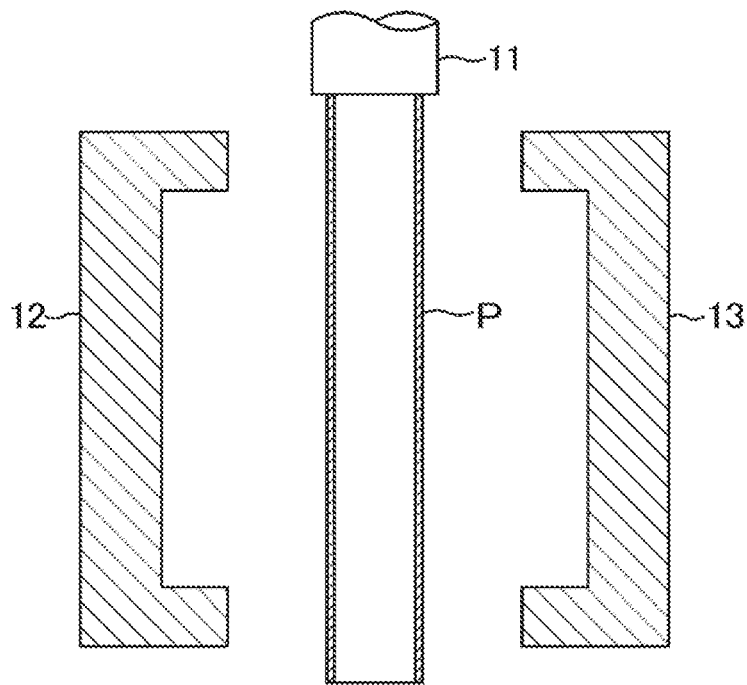
FIG. 1 is a schematic cross-sectional view showing an aspect of blow molding in a first embodiment.

FIG. 1 is a diagram for explaining a blow molding method molding a duct as a molded body. In blow molding, at first, resin material used for molding is melt-kneaded in an extruder to prepare molding resin. For example, in the case of molding using only virgin resin, a modifier is added to various virgin resin as necessary and the resin is melt-kneaded to produce molding resin. When recovered resin material is used, a predetermined ratio of virgin resin is added to the pulverized recovered resin material, and the mixture is kneaded to produce molding resin.

The resin material used for molding is arbitrary, and for example, a thermoplastic resin such as polypropylene included in polyolefin resin is used. In the case that the molded body (i.e. duct 1) is a foam molded body, a foaming agent is added to the molding resin.

After the prepared molding resin is melt-kneaded in an extruder, the resin is stored in an accumulator in molds. Next, after a predetermined amount of resin is stored, the ring-shaped piston is pushed down in a direction perpendicular to the horizontal direction (i.e. vertical direction). Then, a cylindrical parison P is extruded from the die slit of the annular die 11 shown in FIG. 1 at a predetermined extrusion speed into the space between molds 12 and 13. Thereafter, the molds 12 and 13 are clamped to sandwich the parison P, and air is blown into the parison P within a predetermined pressure range to mold the duct 1.

Figure 2:
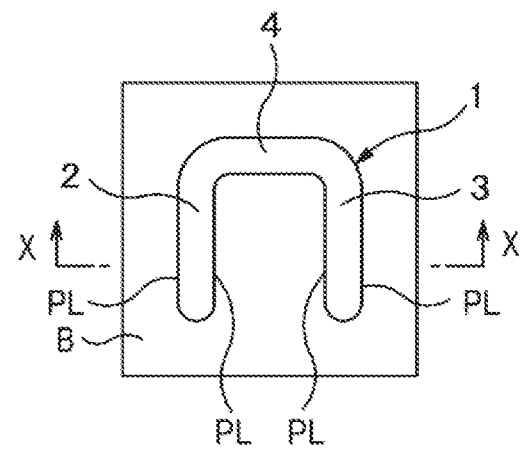
FIG. 2 is a schematic plan view showing an example of a molded body before removing a burr.

FIG. 2 shows an example of the shape of the molded duct 1, and shows a state where the duct 1 after blow molding is taken out of the molds 12 and 13. The duct of the present example is composed of two duct portions 2 and 3 arranged in parallel and of a connecting duct portion 4 connecting these duct portions 2 and 3. An extra parison P remains as a burr B around the duct 1 as a molded body.

Figure 3:
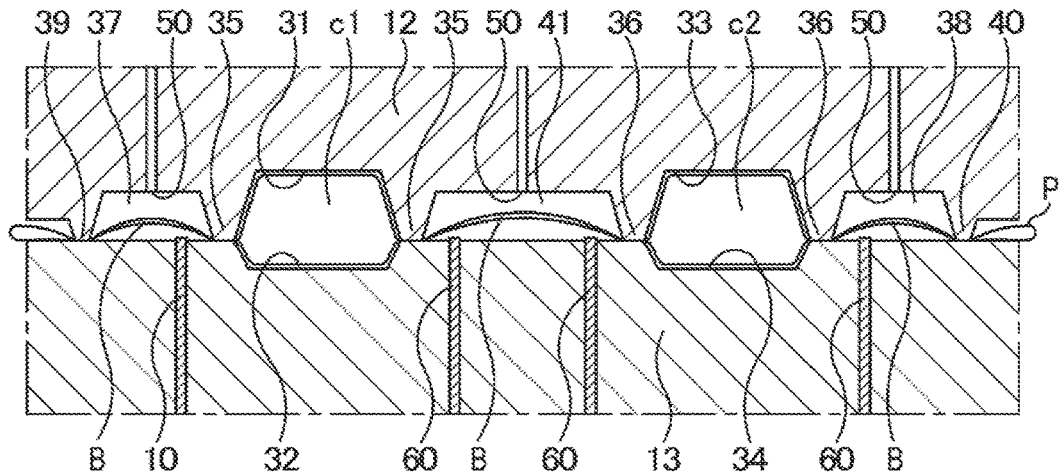
FIG. 3 is a schematic cross-sectional view showing a molding process of a molded body and shows an operation from molding to removing a burr.
Figure 4:
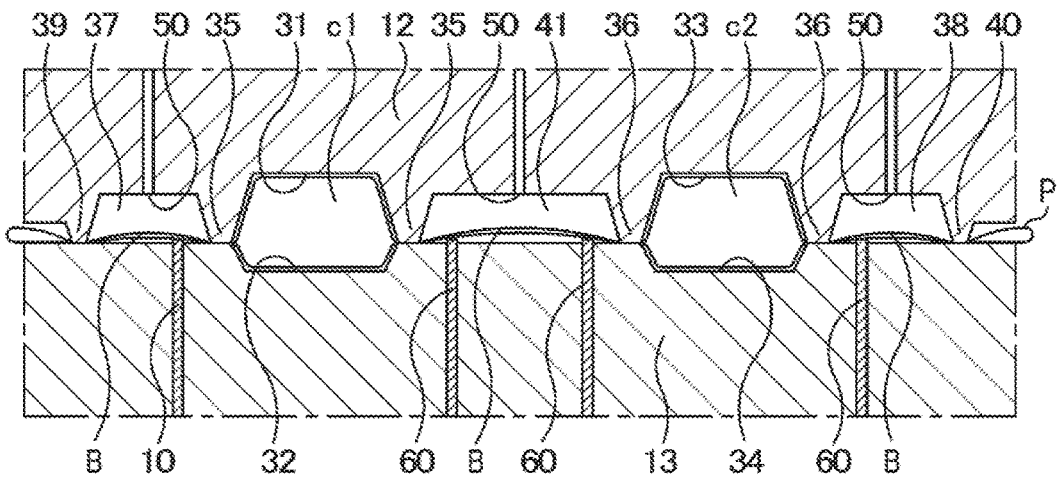
FIG. 4 is a schematic sectional view showing a burr cooling process by air blow.
Figure 5:
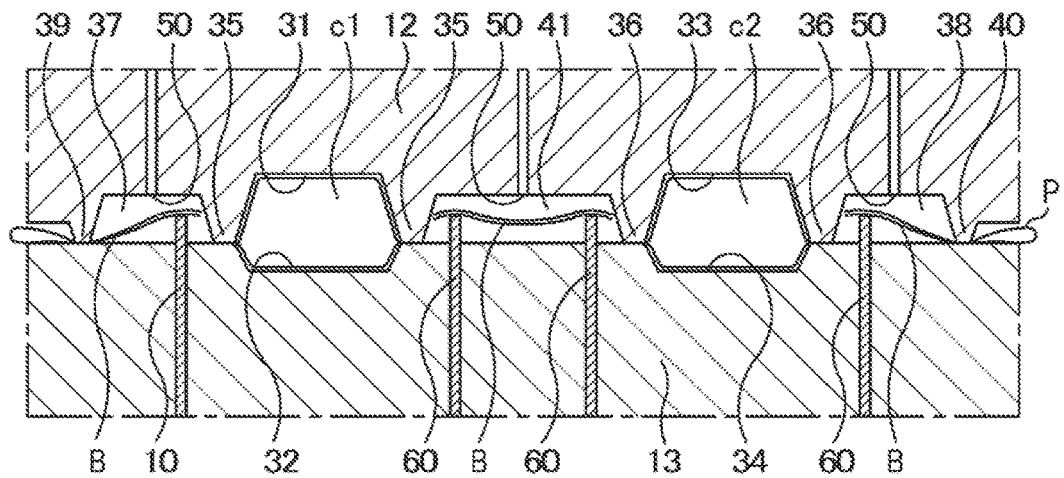
FIG. 5 is a schematic cross-sectional view showing a projecting process of a projecting member.

In the blow molding method of the present embodiment, the steps from molding of the duct 1 to separate the burr B are performed in the molds 12 and 13. Hereinafter, configurations of the molds 12 and 13 and a molding method using the molds 12 and 13 will be described with reference to FIG. 3 to FIG. 5. Here, FIG. 3 to FIG. 5 show cross sections of the duct 1 at a position corresponding to the line x-x shown in FIG. 2.

The molds 12 and 13 used for molding the duct 1 have concave portions corresponding to the shape of the duct 1. As shown in FIG. 3, the concave portions 31 and 32 corresponding to the duct portion 2 and the concave portions 33 and 34 corresponding to the duct portion 3 are formed on the molds 12 and 13. Here, a cavity (i.e. space) c1 corresponding to the duct portion 2 is formed between the molds 12 and 13 by the concave portions 31 and 32, and a cavity (i.e. space) c2 corresponding to the duct portion 3 between the molds 12 and 13 by the concave portions 33 and 34.

The material of the molds 12 and 13 is not particularly limited. For example, aluminum or steel can be used. Aluminum is preferably used because it's high thermal conductivity make a burr to be punched cool efficiently.

The parison P supplied between the molds 12 and 13 is formed into a shape along the concave portion 31 and 32 (i.e. the shape of the cavity c1) or the concave portion 33 and 34 (i.e. the shape of the cavity c2) of the molds 12 and 13 by inside air blowing after the molds 12 and 13 are clamped.

Further, on the outer peripheral portion of each cavities c1 and c2 (i.e. the duct 1 as a molded body), each of the molds 12 and 13 has a pinch portion which abuts each other. A pinch portion 35 is provided around the cavity corresponding to the duct portion 2, and a pinch portion 36 is provided around the cavity corresponding to the duct portion 3. On these pinch portions 35 and 36, the parison P is crushed, and this portion becomes a parting line (PL) of the molded body.

Here, the parison P remaining outside the pinch portions 35 and 36 becomes a burr B. In the present embodiment, a mechanism for separating the burr B from the duct 1 as a molded body is provided on the molds 12 and 13.

First, outside of the pinch portions 35 and 36 of the molds 12 and 13, the molded body surfaces of the mold 12 are retracted to form spaces 37 and 38 for accommodating the burr B. In FIG. 3, a space 37 is formed outside of the left pinch portion 35 of the cavity c1 corresponding to the duct portion 2, and a space 38 is formed outside the right pinch portion 36 of the cavity c2 corresponding to the duct portion 3. The burr B near the pinch portions 35 and 36 is accommodated in these spaces 37 and 38.

The spaces 37, 38 are formed such that the opposite ends are closed with pinch portions 39, 40 which are formed at a predetermined distance from the pinch portions 35, 36. That is, the spaces 37 and 38 are formed so that the pinch portions 35 and 36 is first pinch portions, the pinch portions 39 and 40 is second pinch portions, and the spaces is between these pinch portions. By making the spaces 37 and 38 closed, air (cool air) blown from an air blowing mechanism described later does not escape from the spaces 37 and 38. Here, a pin for air release may be inserted into the spaces 37 and 38, or another air release mechanism may be provided, in order to release air from these spaces 37 and 38 at the time of air blowing.

Each of the spaces 37 and 38 is provided with an air blowing mechanism and a projection member, which are used to separate the burr B from the molded body (duct 1). More specifically, in the present embodiment, a blowout hole 50 for blowing air is formed in the upper (in the figures) mold 12 corresponding to the spaces 37 and 38. Air (cool air) is blown out from the blowout hole 50, and is blown to the burr B.

On the other hand, in the figures, the lower mold 13 is provided with a projecting rod 60 as a projecting member arranged in a position close to and along the pinch portions 35 and 36. The projecting rod 60 is a rod-shaped member having a diameter of about 20 mm to 30 mm, and the tip of the projecting rod 60 is set so as to slightly project from the molded body surface of the mold 13. By projecting the projecting rod 60 from the molded body surface, the burr B is pressed toward the facing molded body surface of the mold 12.

Figure 6:
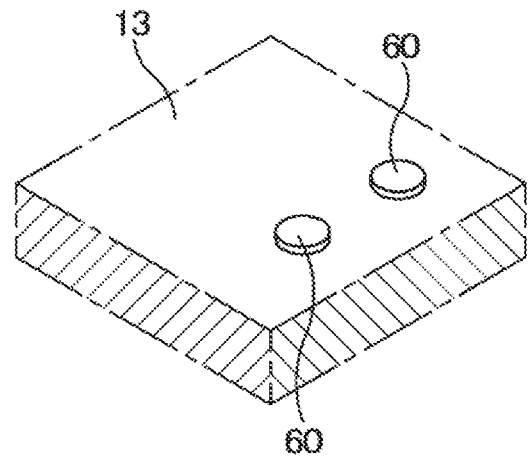
FIG. 6 is a schematic perspective view of a main part showing an example of a projecting rod.
Figure 7:
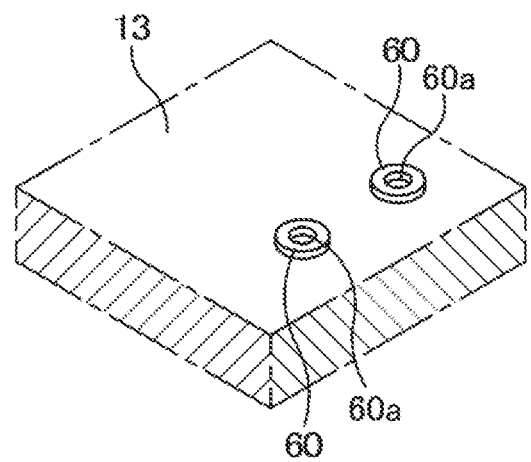
FIG. 7 is a schematic perspective view of a main part showing another example of a projecting rod.
Figure 8:
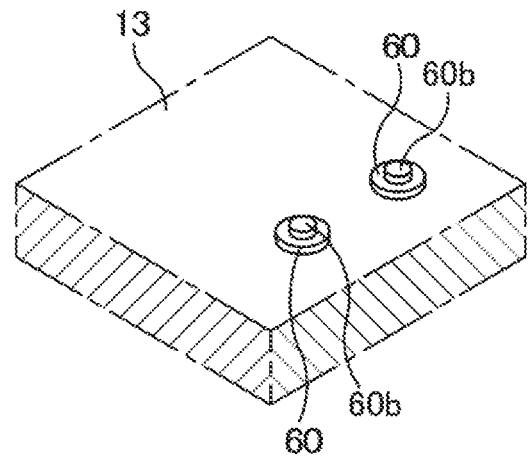
FIG. 8 is a schematic perspective view of a main part showing still another example of a projecting rod.

The shape of the projecting rod 60 is arbitrary. For example, as shown in FIG. 6, a rod-shaped body having a circular cross section may be used, or as shown in FIG. 7, a rod-shaped body having a concave portion 60a at the center of the end surface and having an annular projection may be used. Alternatively, as shown in FIG. 8, a rod-shaped body having a projection 60b with a slightly smaller diameter at the tip can be used. In any case, it is preferable that when the burr B in the molten state is pressed by air blowing, the shape of the tip of the projecting rod 60 is transferred to the burr B, and the burr B is prevented from shifting by locking at the time of extrusion. From such a viewpoint, it is preferable that the tip of the projecting rod 60 has the shape shown in FIG. 7 and FIG. 8.

As described above, the projecting rod 60 is arranged along the pinch portions 35 and 36, and the cutability is improved as the interval of the projecting rods 60 is narrower. Therefore, it is preferable that the arrangement pitch (i.e. arrangement interval) of the projecting rods 60 is within 170 mm.

Further, as the operating means of the projecting rods 60, for example, a hydraulic system can be adopted, and a method of operating each of the projecting rods 60 independently or a method of operating simultaneously by using a mold back plate or the like can be used. Depending on the shape of the molded body, it is possible that the burr treatment is performed smoothly by changing the timing at which the projecting rod 60 hits the burr. In this case, the stroke of each projecting rod 60 may be adjusted as appropriate.

The burr B outside the duct portions 2 and 3 are as described above, and the burr B between the duct portions 2 and 3 can be handled by the same configuration. Here, regarding the burr B between the duct portions 2 and 3, it is not necessary to form the second pinch portion. It is sufficient that a space 41 is formed between the pinch portion 35 of the duct portion 2 and the pinch portion 36 of the duct portion 3, and that a blowout hole 50 for blowing air and a projecting rod 60 are installed in the space 41. In the spaces 37 and 38, the projecting rods 60 are arranged at one side (one row) of the molded body side (i.e. on the duct portion 2 side or the duct portion 3 side). But in the space 41, the projecting rod 60 is arranged at two side of the duct portion 2 side and the duct portion 3 side.

Next, each step of performing blow molding using these molds 12 and 13 will be described. As described above, in order to blow-mold the duct 1 as a molded body, the parison P supplied from the die slit of the annular die 11 is sandwiched between the molds 12 and 13, and the air is blown into the parison P to form the parison P into the cavity shape of the molds 12 and 13. FIG. 3 shows this state. The parison P is sandwiched between the molds 12 and 13, and the duct portions 2 and 3 are molded in the cavities c1 and c2 of the molds 12 and 13.

After the molding of the duct portions 2 and 3 is completed, air is supplied from a blowout hole 50 provided in the mold 12 as shown in FIG. 4, and air blow to the surface of the burr B is performed. The supplied air is preferably cold air. Further, it is preferable that air blow here is performed such that the air hits the burr B near the pinch portions 35 and 36. This air blow cools the burr B and increases the rigidity in a short time.

The air blow has not only a function of cooling the burr B, but also a role of pressing the burr B against the projecting rod 60. By pressing the burr B against the projecting rod 60, the burr B can be pressed against the opposite mold 12 with a large stroke by projecting of the projecting rod 60, and the burr B can be reliably separated from the molded body.

Figure 9:
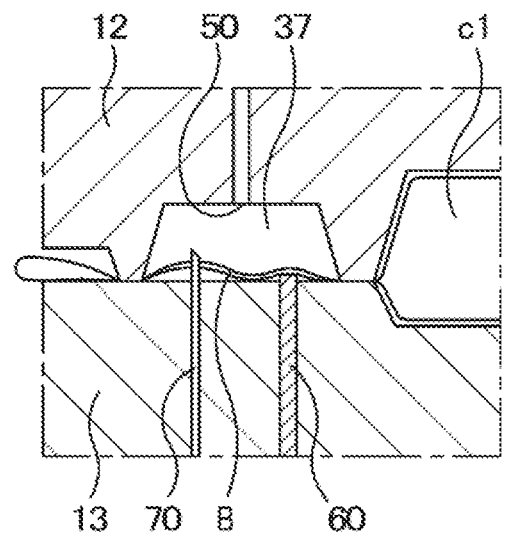
FIG. 9 is a schematic cross-sectional view of a main part showing a state in which a burr is pressed against a projecting rod and air discharge pins are pierced into the burr.

FIG. 9 shows a state in which the burr B are pressed against the mold 13 provided with the projecting rod 60 by the air blow from the blowout hole 50. The burr B pressed by the air blow is in a molten state at an initial stage, and the tip shape of the projecting rod 60 slightly projected by the pressing is transferred to form a recess of the burr B. At this time, it is sufficient that at least a part of the tip of the projecting rod 60 projects from the mold 13. For example, in the case that the shape of the projecting rod 60 is as shown in FIG. 7 or FIG. 8, an annular projection around the concave portion 60a or a central projection 60b protrudes from the mold 13, and the other portions may be flush with the mold 13. When the cooled the burr B is pressed with the projecting rod 60 in a state where the concave portion is formed, the tip of the projecting rod 60 is locked in the concave portion, and the displacement does not occur due to slipping of the burr B and the like. As a result, the burr B can be reliably pressed by projecting rod 60 and separated from the molded body.

Further, in the example shown in FIG. 9, the mold 13 is provided with an air discharge pin 70 for discharging air. The air discharge pin 70 pierces the burr B pressed by the air blow, and the air between the mold 12 is also effectively discharged. Therefore, it is preferable that the amount of protrusion of the air discharge pin 70 from the mold 13 is set so as to penetrate the burr B pressed by the air blow. However, if the amount of protrusion of the air discharge pin 70 is too large, the burr B may be pierced deeply inside and air discharge pin 70 may not be easily removed from the burr B when the burr B is pressed by the projecting rod 60. Thus, it is preferable that the air discharge pin 70 slightly projects from the burr B pressed by the air blow.

After the burr B is cooled by the air blow, as shown in FIG. 5, the burr B with increased rigidity is pressed against the mold 12 on the opposite side by the projecting rod 60, and the burr B is separated (cutoff) from the molded body. The burr B outside the duct portions 2 and 3 are separated from the molded body in the spaces 37 and 38 by the protrusion of the projecting rod 60 provided near the pinch portions 35 and 36. The burr B between the duct portions 2 and 3 are separated from the molded body in the space 41 by the protrusions of two projecting rods 60 provided near the pinch portion 35 and 36 respectively.

As described above, the burr B is separated from the molded body in the molds 12 and 13. That is, in the blow molding method of the present embodiment, the molding and the burr treatment of the molded body are completed in the molds, and the molding and the burr treatment can be performed more efficiently than ever.

The first embodiment according to the present invention has been described above. However, needless to say, the present invention is not limited to the above-described embodiment, and various changes may be made without departing from the gist of the present invention.

For example, in the molds, the burr B may be separated around the entire periphery of the molded body. In this case, completely separated burr may remain in the molds. In such a case, the burr B may be separated such a way that a part of the burr B is connected to the molded body. The separation of the connecting portion can be easily performed after removing the molded body from the molds.

Further, in the above-described mold configuration, for example, in the case that the molded body is large and the distance between the duct portion 2 and the duct portion 3 is long, the size of the burr B increases, and the force of the projecting rod 60 is not sufficiently applied to the burr B. In such a case, the mold may be provided with a protruding portion having an inclined surface, thus the gap between the opposing molds is narrowed at the top of the inclined surface. As a result, the burr B is sandwiched by the inclined surfaces, and the press by the projecting rods 60 can be performed reliably.

Figure 10:
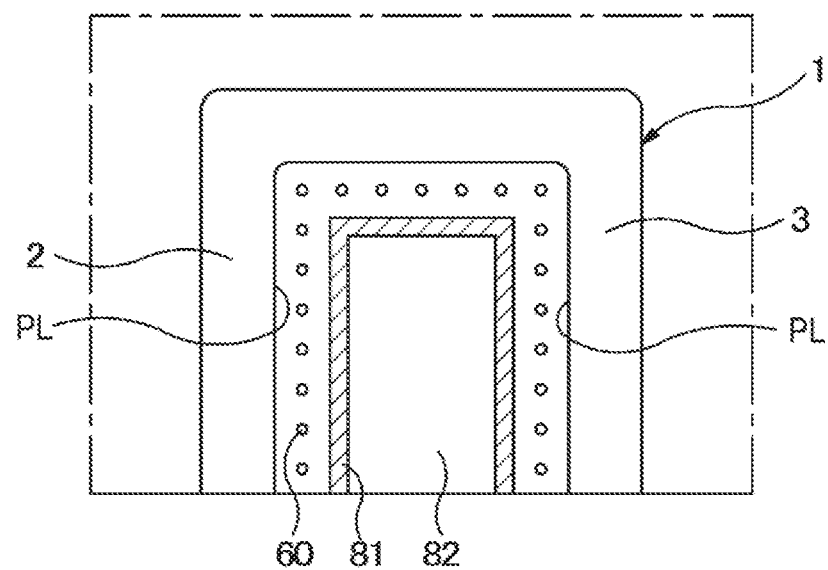
FIG. 10 is a schematic plan view showing an example of a mold in which an inclined surface is formed in a space between molded bodies.
Figure 11:
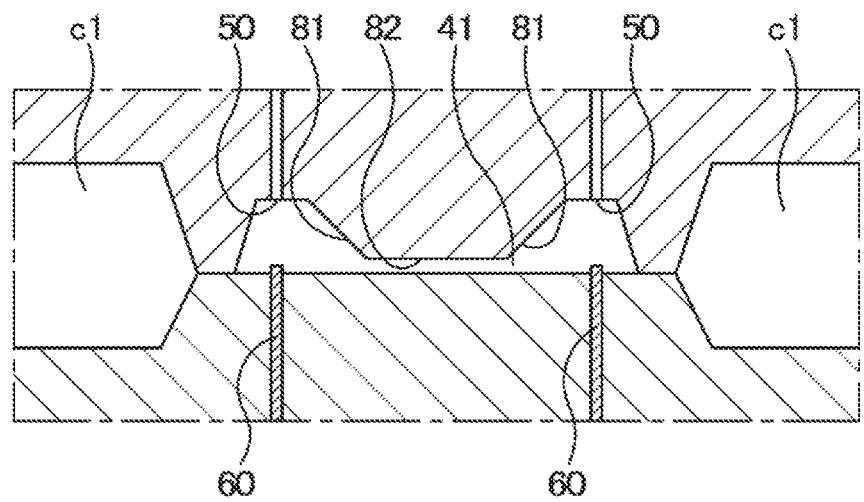
FIG. 11 is a schematic sectional view of the mold shown in FIG. 10.

FIG. 10 shows an example in which an inclined surface is formed on the upper (in the figure) mold 12 in a region between the duct portions 2 and 3, and FIG. 11 is a schematic sectional view of the mold shown in FIG. 10.

As shown in FIG. 10, in the region between the duct portions 2 and 3, the projecting rods 60 are arranged along the pinch portions 35 and 36 of the duct portions 2 and 3. If the distance between the duct portion 2 and 3 is long, the burr B moves freely even when the burr B are cooled by air blow, and the force of the projecting rod 60 is not sufficiently applied.

Therefore, in the present example, a trapezoidal portion 82 having an inclined surface 81 is formed on the mold 12, and the burr B is sandwiched therebetween. In FIG. 10, a hatched area is an inclined surface 81.

Figure 12:
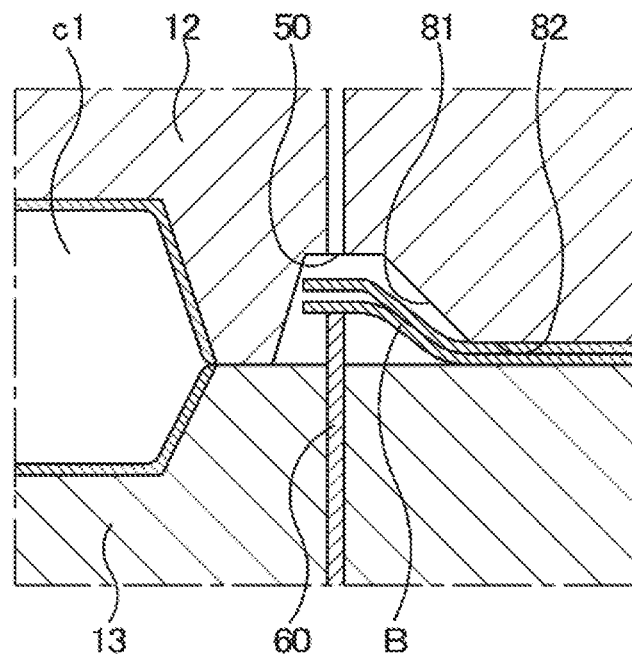
FIG. 12 is a schematic cross-sectional view showing a partly enlarged burr removal process with the mold shown in FIG. 10 and FIG. 11.

When the trapezoidal portion 82 having the inclined surface 81 is formed on the mold 12, as shown in FIG. 11, the distance between the mold 12 and the mold 13 is reduced in this portion. If the distance is set to a level that can hold the burr B, the burr B is sandwiched between the molds 12 and 13 at this portion. As shown in FIG. 12, by this portion as a fulcrum, the force of the projecting rod 60 is reliably applied to the burr B, and the burr B is separated smoothly.

Figure 13:
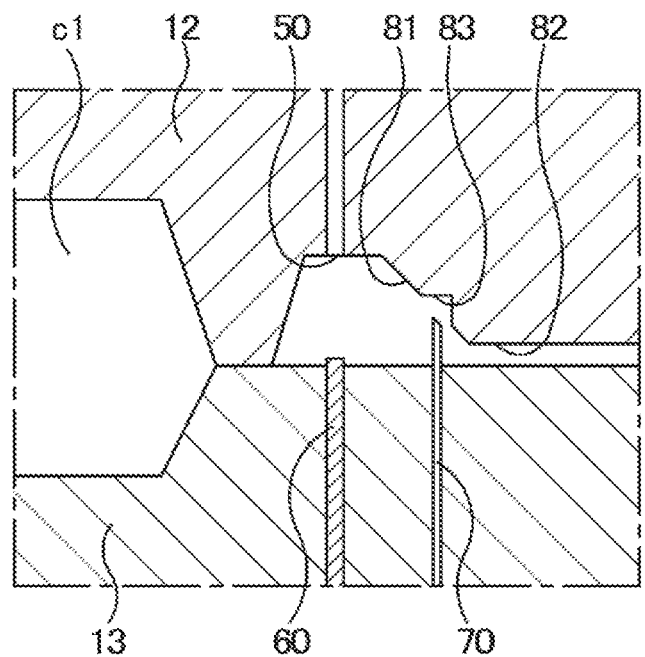
FIG. 13 is a schematic cross-sectional view of a main part showing a state that a counterbore portion is formed on an inclined surface.

In the case that the inclined surface 81 is formed, and for example, the air discharge pin 70 is installed in the mold 13, it is preferable that a counterbore portion 83 is provided at a portion facing the air discharge pin 70 as shown in FIG. 13. As a result, the air discharge pin 70 does not collide with the inclined surface 81 of the mold 12.

Regarding the method of manufacturing the molded body, in the above embodiment, the case that the parison P is blow-molded has been described as an example. However, the present invention can be applied to such a method, a mold, and a manufacturing apparatus that a burr is formed around the molded body, such as a method of molding a sheet with a mold.

Next, a description will be given of a molding line incorporating the above-described molded body manufacturing apparatus. As described above, in the above embodiment, the molding and the burr treatment of the molded body are completed in the mold, and the molding and the burr treatment can be performed more efficiently than ever. In order to make these process more efficient, it is possible to automate a series of steps from discharge of burr to conveyance of the molded body.

Figure 14:
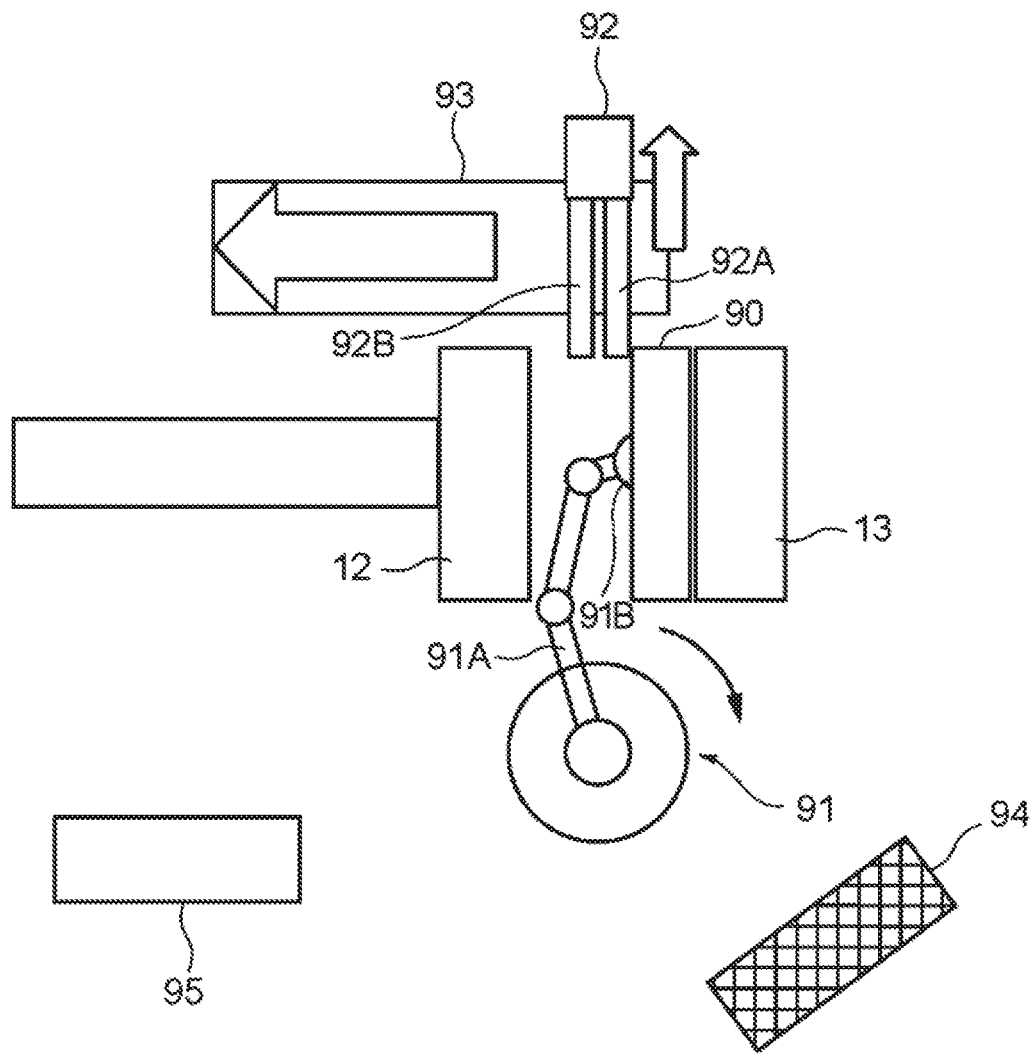
FIG. 14 is a diagram illustrating a molding line for automatically removing a burr and molded bodies, and is a diagram illustrating a process of removing the molded bodies.
Figure 15:
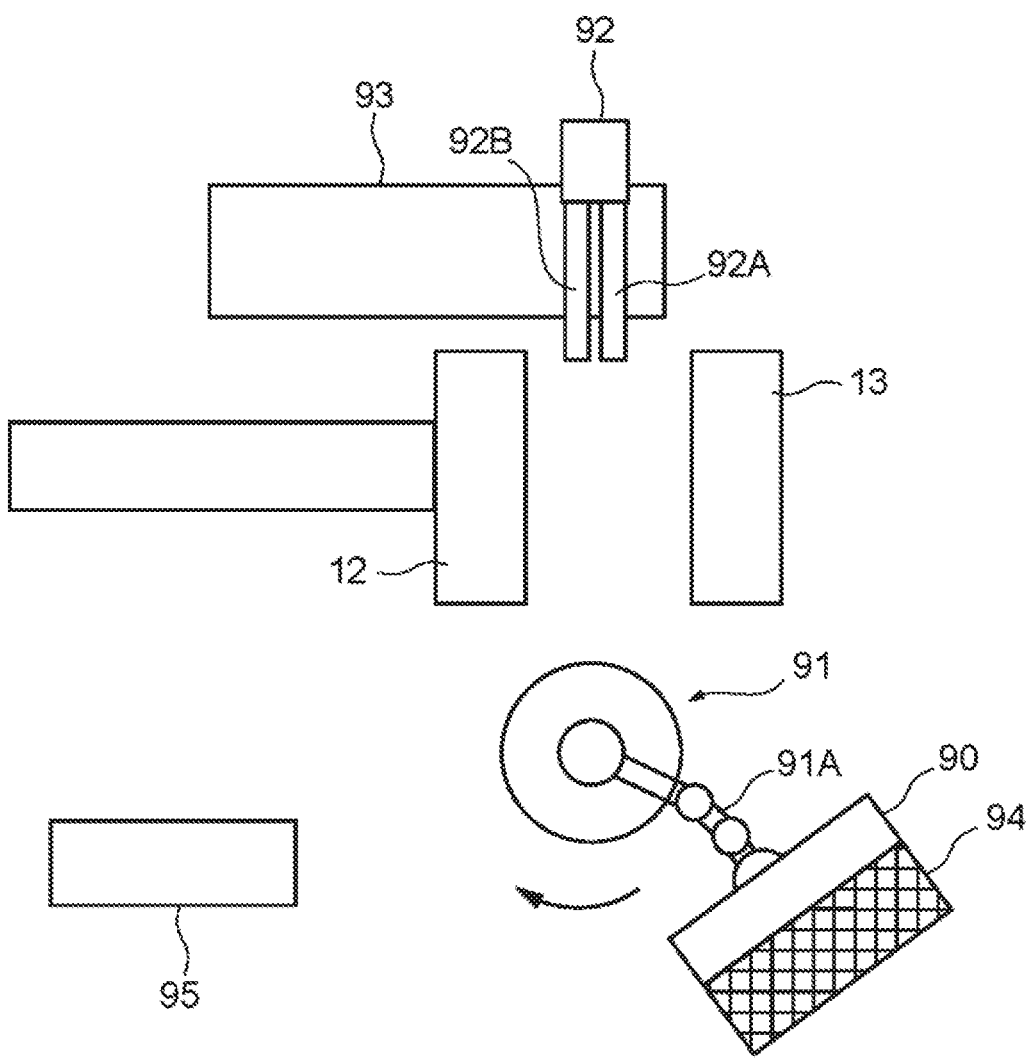
FIG. 15 is a diagram showing a processing process of a molded body.
Figure 16:
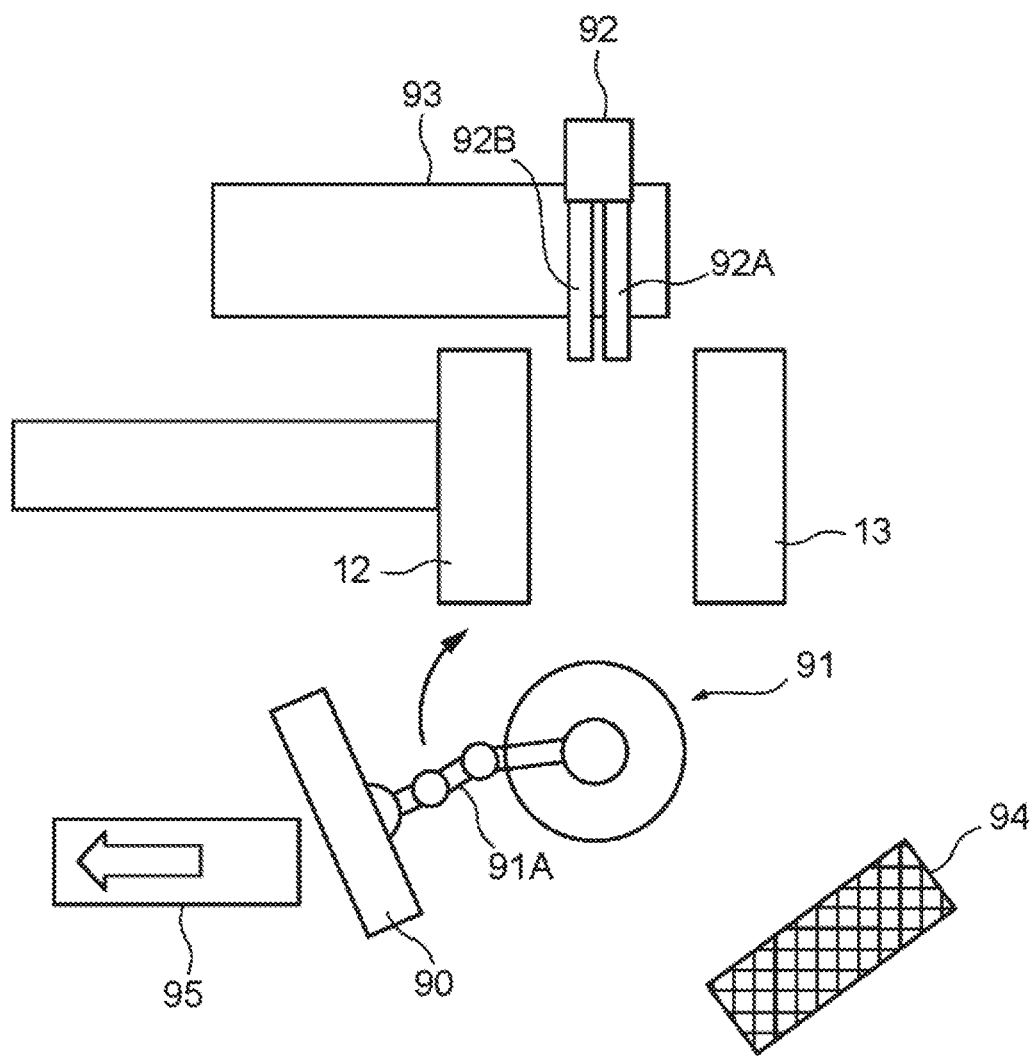
FIG. 16 is a view showing a process of unloading a molded body.

FIG. 14 to FIG. 16 shows an example of a molding line. In this molding line, around a molding apparatus having molds 12 and 13 for molding a molded body 90 (corresponding to the duct 1 in the above embodiment), a molded body take-out mechanism 91 and a burr discharge mechanism (a burr gripping robot 92 and a burr transport conveyor 93), a processing machine 94 for the molded body 90, and a molded body unloading conveyor 95 for unloading the molded body 90 are arranged.

The molded body take-out mechanism 91 is an articulated robot here, includes a rotating multi-jointed arm 91A, and a head portion 91B at its tip for sucking the molded body 90 by vacuum suction or the like. The molded body 90 is sucked and held by the head portion 91B at the tip of the multi-jointed arm 91A, and is sequentially conveyed to the processing machine 94 and the molded body unloading conveyor 95 as the multi jointed arm 91A rotates.

The burr discharge mechanism comprises a burr gripping robot 92 and a burr transport conveyor 93. The burr (not shown) separated from the molded body 90 in the molds 12 and 13 is sandwiched between the two arms 92A and 92B of the burr gripping robot 92, and is drawn from the molds 12 and 13 to the burr transport conveyor 93. Since the burr of the molded body 90 is formed so as to protrude from the molds 12 and 13, this part can be easily sandwiched between the two arms 92A and 92B of the burr gripping robot 92.

The processing machine 94 processes the molded body 90 taken out of the molds 12 and 13, and for example, performs cutting of fine burr or the like.

When the molding process of the molded body 90 and the separation process of the burr in the molds 12 and 13 are completed, the molds 12 and 13 are opened as shown in FIG. 14. At the same time, the burr is drawn by the two arms 92A and 92B of the burr gripping robot 92 and discharged by the burr transport conveyor 93. The molded body 90 is sucked and held by the head portion 91B at the tip of the multi-jointed arm 91A, and is taken out of the molds 12 and 13.

Next, as shown in FIG. 15, the molded body 90 is transferred to the processing machine 94 by the horizontal rotation of the multi jointed arm 91A. The molded body 90 transferred to the processing machine 94 is subjected to fine burr cutting or the like to be completed as a product.

As shown in FIG. 16, the molded body 90 that processed by the processing machine 94 is transferred to the molded body unloading conveyor 95 by the horizontal rotation of the multi-jointed arm 91A to be carried out. That is, one rotation of the multi jointed arm 91A performs a series of steps from taking-out of the molded body 90 from the molds 12 and 13 to carrying out of the product.

Considering such a molding line, it is necessary that the molded body 90 is held with a specific mold (the mold 13 in the case above) when the molds 12 and 13 are opened. If the mold holding the molded body 90 is different each time molding is performed, it is difficult to reliably take out the molded body 90 by the molded body take-out mechanism 91. For example, if the molded body take-out mechanism 91 is set to take out the molded body 90 held with the mold 13, it is impossible to take out the molded body 90 when held with the mold 12.

In order to eliminate such inconvenience, it is preferable to provide a device that can lock the molded body 90 in one mold. However, it is necessary to avoid affecting the shape of the product portion of the molded body 90.

In order to realize this, it is effective that a cap bolt 96 is installed on a disposal bag portion of a mold (for example, the mold 13) on the side that holds the molded body 90 and head portion 96A of the cap bolt 96 is dug into the disposal bag portion of the molded body 90. For example, in the blow molding of a molded body (such as a duct) having an opening, an opening cannot be formed in the molded body 90 at the time of molding. Thus, a disposal bag portion is formed to close the molded body during molding process, and an opening is formed by cutting the disposal bag portion to form the opening. Since the disposal bag portion is cut off from the product, it is possible to reliably hold the molded body 90 with the specific mold 13 without affecting the product even if the cap bolt 96 is dug into the disposal bag portion.

FIGS. 17A and 17B show a molded state of the disposal bag portion. FIG. 17A shows a molded state in which the cap bolt 96 as a locking tool is not installed, and FIG. 17B shows a state in which the cap bolt 96 is installed. When the cap bolt 96 is not installed, the molded body state of the disposal bag portion 90A is equivalent to the molds 12 and 13. When the molds 12 and 13 are opened in this state, the molded body 90 may remain on the mold 12 side or on the mold 13 side.

On the other hand, if the cap bolt 96 is installed on the mold 13, the head portion 96A of the cap bolt 96 will be dug into a predetermined location 90B of the disposal bag portion 90A, the disposal bag portion 90A will be caught, and the molded body 90 will reliably remain on the mold 13 side.

Note that the cap bolt 96 may be selected with appropriate size depending on the size of the molded body 90, the degree of catching, or the like. More specifically, the size of the cap bolt 96 is standardized, such as M8 or M6 (in Japanese Industrial Standards) etc., and an appropriate size can be selected from these and installed on the disposal bag portion of the mold. The cap bolt 96 can be attached to a mold like a normal bolt, and can be easily replaced.

(2) Second Embodiment

A burr removal method and a burr removal apparatus according to the second embodiment will be described in detail with reference to the drawings.

Figure 18:
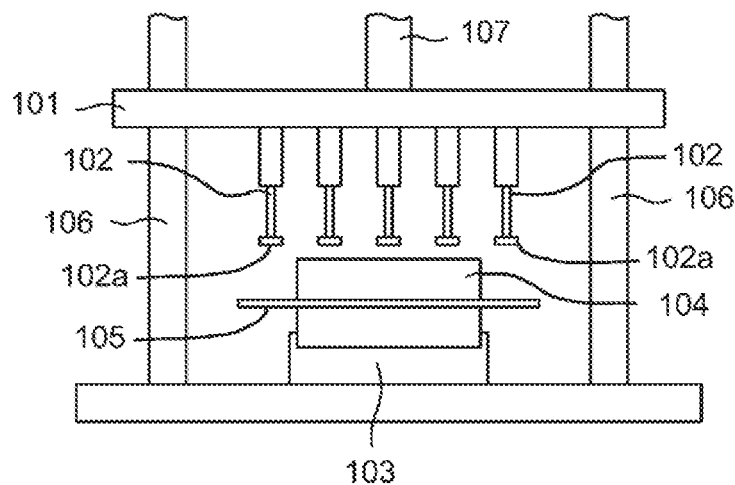
FIG. 18 is a schematic side view showing an example of a burr removal device according to a second embodiment.

FIG. 18 is a diagram showing a schematic configuration of a burr removal apparatus to which the present invention is applied. In the burr removal apparatus of the present embodiment, as shown in FIG. 18, a plurality of press jigs 102 are attached to a support substrate 101 which moves up and down. The burr 105 formed around the molded body 104 placed on the receiving base 103 are pressed downward by the press jig 102 and are separated from the molded body 104.

The press jig 102 is a rod-shaped jig, the tip of which is a flat surface 102a. The flat surface 102a presses the burr 105 downward. The structure of the press jig 102 is not limited as long as it is rod-shaped. For example, a hexagonal bolt or the like can be used. Since the hexagonal bolt has a hexagonal head with a larger diameter than the shaft, the hexagonal bolt has an end surface with a certain area. Thus, the burr 105 can be reliably pressed. Further, the hexagonal bolt is movable forward and backward by rotation, like a normal bolt, and the length can be adjusted using this feature.

Here the tip end surface of the press jig 102 is a flat surface 2a. However, for example, if the flat surface 102a is provided with a projection, the press jig 102 is prevented from sliding when contact with the burr 105.

The support substrate 101 has insertion holes formed at four corners, and the support shaft 6 is inserted therein. A press mechanism 7 is provided on the back side of the support substrate 101, and by operating the press mechanism 7, the support substrate 101 moves up and down along the support shaft 6. In particular, when the support substrate 101 is pushed downward by the press mechanism 7, the press jig 102 attached to the support substrate 101 is pushed downward.

The press jig 102 is mounted on the lower surface of the support substrate 101. For example, on the lower surface of the support substrate 101, if the press jigs 102 can be mounted at the respective intersections of the lattice, it is possible to arrange the press jigs 102 along the external shape (parting line) of the molded body 104 by selecting the intersection where the press jig 102 is mounted. In addition, by changing the intersection where each press jig 102 is mounted, it is possible to easily cope with a change in the size or shape of the molded body 104.

Next, a burr removal method using the burr removal apparatus having the configuration shown in FIG. 18 will be described.

The molded body 104 is formed by, for example, blow molding, and is supplied between the molds in a way that a parison is hung from a die, and the molds are closed and air is blown into the inside to form a cavity shape of the mold. Around the cavity of the mold, the parison is sandwiched by the mold and crushed to form a parting line PL. A surplus portion outside the parting line PL is a burr 105.

The molded body 104 is formed of, for example, a polyolefin resin such as polyethylene or polypropylene, but is not limited thereto, and may be formed of any resin material. The molded body 104 may be a non-foamed (so-called solid) molded body, or may be a foam molded body of a foamed resin.

When the molded body 104 after molding is taken out of the mold, the burr 105 remain around the molded body 104 at this time. Then, the molded body 104 taken out of the mold is placed on the receiving base 103 of the burr removal apparatus shown in FIG. 18. The receiving base 103 has substantially the same shape and dimensions as the molded body 104, and supports the lower surface of the molded body 104. The burr 105 is formed outside the periphery of the molded body 104, and there is no receiving base 103 below the burr 105.

Figure 21:
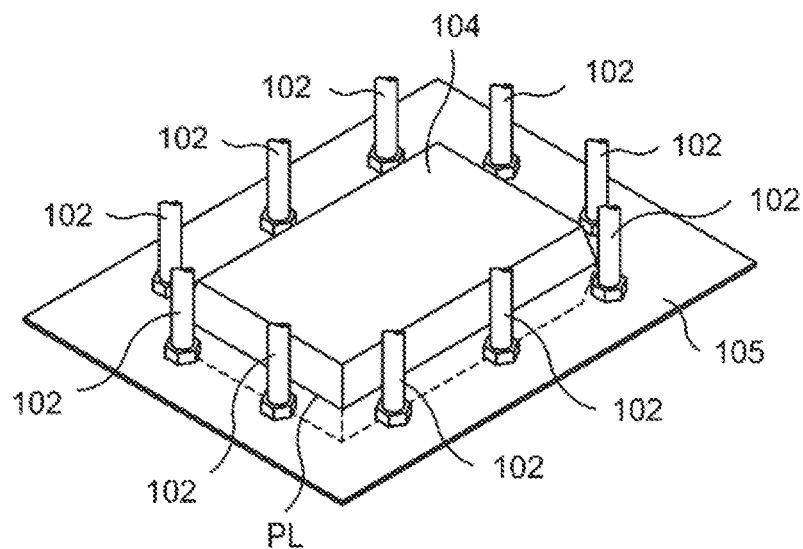
FIG. 21 is a schematic perspective view showing an example of an arrangement state of a rod-shaped press jig.
Figure 22:
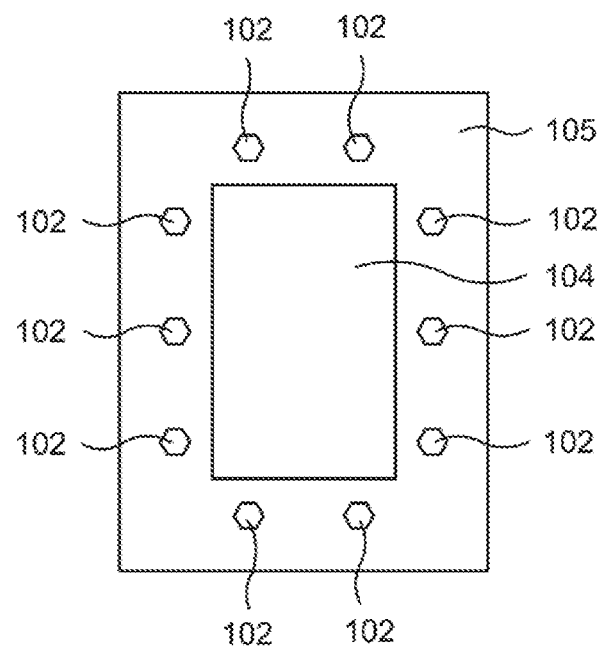
FIG. 22 is a schematic plan view showing an example of an arrangement state of rod-shaped press jigs.

In the burr removal apparatus, rod-shaped press jigs 102 are arranged on the support substrate 101 in accordance with the shape and size of the molded body 104. FIG. 21 and FIG. 22 are views showing an arrangement state of the press jig 102. As shown in FIG. 21 and FIG. 22, the press jigs 102 are arranged so as to abut against the burr 105 at positions outside the parting line PL of the molded body 104. It is preferable that the interval between the installation position of the press jig 102 and the parting line PL is not so large, and that the burr 105 is pressed at a position as close as possible to the parting line PL. Thereby, the burr 105 is quickly separated and removed from the molded body 104.

The installation interval of the press jig 102 is arbitrary, but if the installation interval is too large, it may be difficult to smoothly separate and remove the burr 105. Therefore, it is preferable that the press jigs 102 are provided at appropriate intervals so that smooth separation and removal can be performed.

Figure 19:
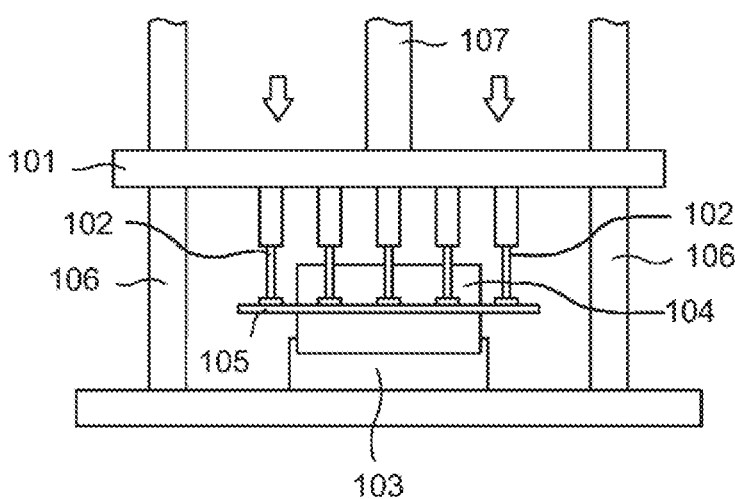
FIG. 19 is a schematic side view showing a state in which a rod-shaped press jig is in contact with a burr.
Figure 20:
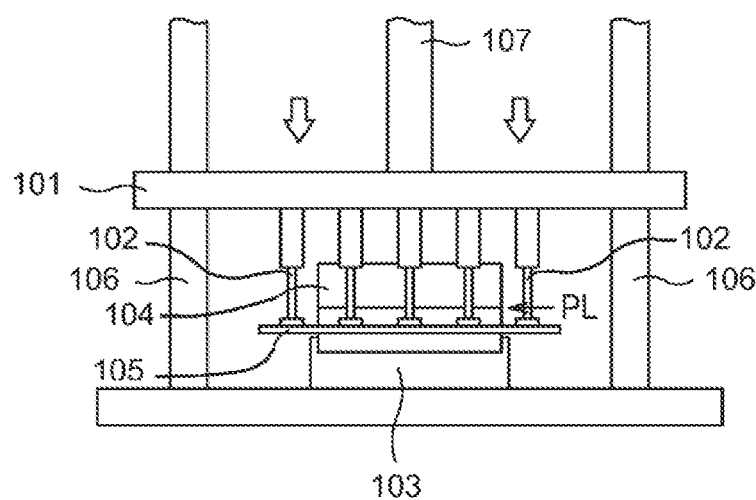
FIG. 20 is a schematic side view showing a state in which a burr is punched out by a rod-shaped press jig

After the molded body 104 is placed on the receiving base 103 and the press jig 102 is set on the support substrate 101, the press mechanism 7 is operated to push the support substrate 101 downward as shown in FIG. 19. Along with this, the press jig 102 is also pushed down, and its flat surface 102a contacts the burr 105. As shown in FIG. 20, when the support substrate 101 is further pushed downward, the burr 105 is pushed further downward by the press jig 102. As a result, the burr 105 is torn off from the molded body 104 and are quickly separated and removed.

According to the burr removal method using the burr removal apparatus of the present embodiment, the time cycle required for removing large burr 105 remaining around the molded body 104 can be about 10 seconds to about 20 seconds. As a result, the length can be significantly reduced as compared, for example, with a case that such a large burr 105 is manually removed.

In the above, the basic configuration of the burr removal apparatus and the burr removal method according to the present invention is described. Note that various design changes can be made in the burr removal apparatus and the burr removal method of the present invention.

For example, in the above example, each press jig 102 is made to simultaneously contact the burr 105 around the molded body 104, but a plurality of press jigs may be pressed against the burr at a different time. Depending on the form of the molded body 104, the ease of the separation of the burr 105 may vary depending on the location. In such a case, one press jig 102 may press the vicinity of a portion where the burr 105 is easily cut (at the easy cutting portion of the burr 105), and then the other press jig 102 may press another portion of the burr 105. As a result, the burr 105 can be more smoothly removed.

Figure 23:
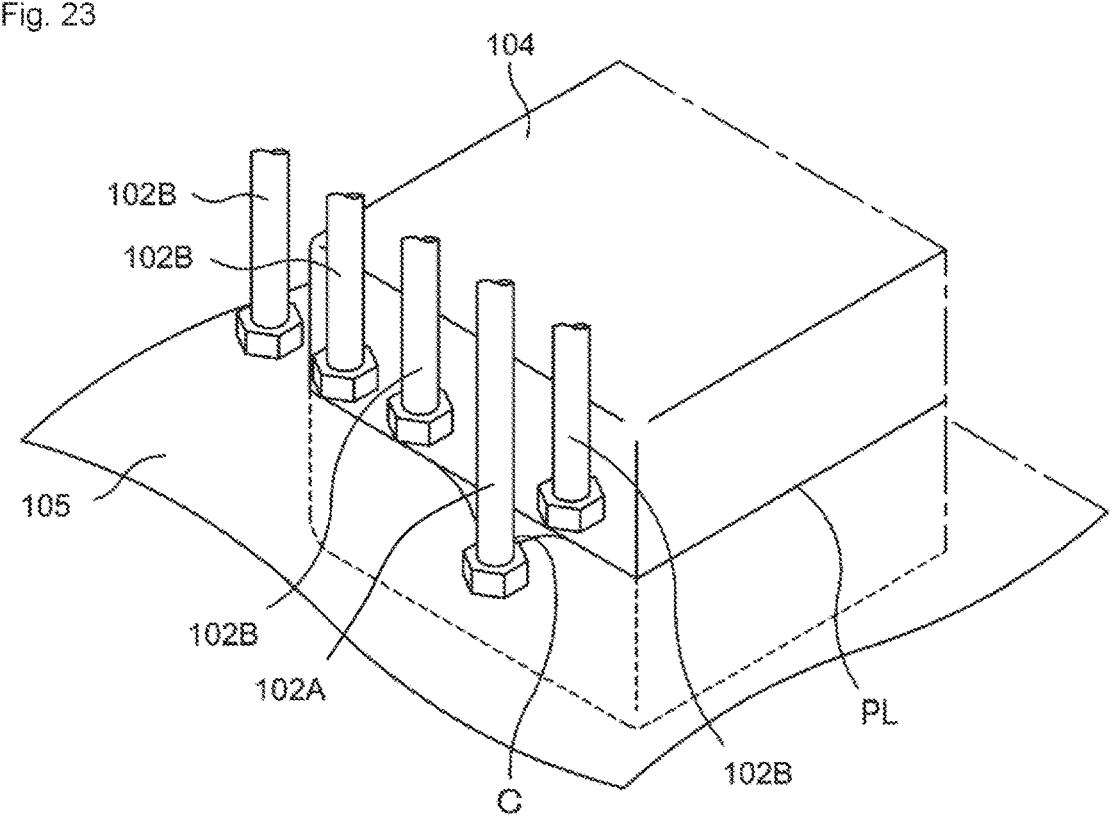
FIG. 23 is a schematic perspective view showing a state in which a rod-shaped press jig is pressed against a burr with a time difference.

FIG. 23 shows an example in which the pressing jig is pressed against the burr with a time difference. In this case, first, the press jig 102A is pressed against the vicinity of a portion where the burr 105 is easily cut (at the easy cutting portion of the burr 105). As a result, the location between the burr 105 and the molded body 104 is torn near the press jig 102A. Next, when another press jig 102B is pressed against the burr 105, the tear C formed by the press jig 102A spreads over the whole, and the burr 105 is removed. At this time, it is preferable that after pressing the press jig 102A, the adjacent press jig 102 is pressed, and then the press jig 102 is pressed in order from the press jig 102 closer to the press jig 102A. As a result, the tear gradually expands starting from the tear portion formed by the pressing of 102A, and the burr 105 is removed very smoothly.

In order to press the press jig 102 against the burr with a time difference as described above, the length of the press jig 102 should be adjusted, and the distance between the flat surface 102a of the press jig 102 and the surface of the burr 105 should be adjusted. For example, if the length of the press jig 102A is the longest and the length of the other press jigs 102B is shorter than this, the press jig 102A contacts the burr 105 at first by pressing down the support substrate 101. Thereafter, another press jig 102B comes into contact with the burr 105. Alternatively, if the length of the press jig 102A is the longest and the other press jigs 102 are gradually shortened as the distance from the press jig 102A increases, it is possible to press the burr 105 sequentially from the press jig 102 located closer to the press jig 102A, after pressing the press jig 102A against the burr 105. The length of the press jig 102 can be easily adjusted. For example, when a hexagonal bolt is used for the press jig 102, the length can be individually adjusted by rotation.

Figure 24:
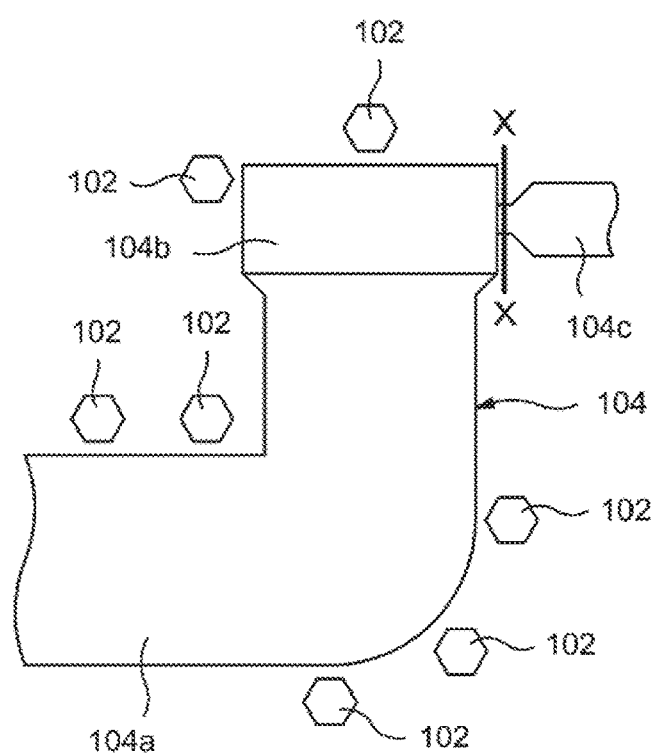
FIG. 24 is a schematic plan view showing an example of a combination of cutting and a press jig.

Also, depending on the molded body 104, there may be a portion where the burr 105 is difficult to cut. For example, as shown in FIG. 24, in the case that a disposal bag portion 104b is formed at an end of the product portion 104a and a blowing portion 104c is connected to the disposal bag portion 104b, it is difficult to cut the portion between the disposal bag portion 104b and the blowing portion 104c. In such a case, cutting by the cutter and cutting by the press jig 102 may be combined.

That is, the x-x line position shown in FIG. 24 is cut by the cutter, while the press jig 102 is arranged corresponding to the burr 105 of the other portion, and the burr 105 of this portion is separated. At this time, as in the previous example, the entire burr 105 may be cut off in a way that the portion cut by the cutter is used as a starting point from which the tear is enlarged.

Figure 25:
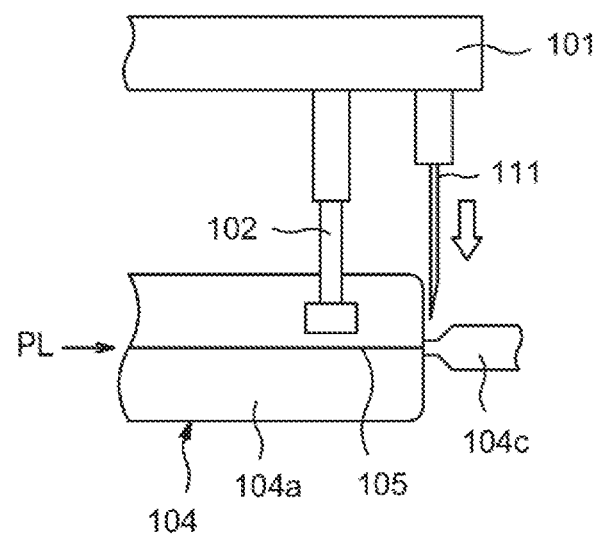
FIG. 25 is a schematic side view showing an example of a combination of cutting and a pressing jig.

FIG. 25 shows an example of a burr removal apparatus that combines cutting with a cutter and cutting with a press jig. A press jig 102 is arranged around a product portion 104a of the molded body 104, and a cutter 111 is provided at a boundary portion (a position x-x in FIG. 23) of the blowing portion 104c. Both the press jig 102 and the cutter 111 are mounted downward on the support substrate 101, and when the support substrate 101 is pressed down, the press jig 102 and the cutter 111 are simultaneously lowered and come into contact with the burr 105.

Next, burr removal process of the molded body 104 in which the parting line PL is not horizontal will be described. The parting line PL of the molded body 104 is not necessarily horizontal along the entire circumference of the molded body 104, and for example, the parting line PL may be formed obliquely.

In such a case, the burr 105 is also formed obliquely along the parting line PL, and the press jig 102 comes into contact with the inclined surface of the burr 105. When the press jig 102 comes into contact with the inclined surface of the burr 105, the force may not be sufficiently applied to the burr 105, which may hinder the cutting of the burr 105.

Figure 26:
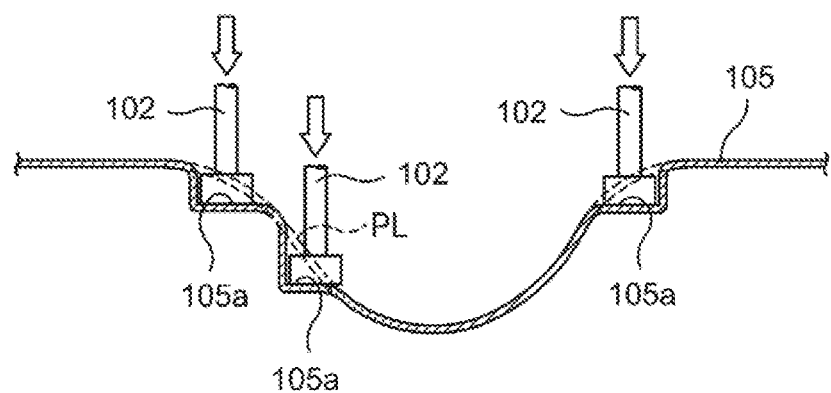
FIG. 26 is a schematic sectional view showing an example of a flat surface formed when a parting line is inclined.

Therefore, in such a case, as shown in FIG. 26, a flat surface 105a is formed at a position where the press jig 102 comes into contact with the inclined burr 105 formed along the parting line PL. Thereby, the flat surface 102a of the press jig 102 comes into close contact with the surface of the burr 105, and the pressing force of the press jig 102 can be sufficiently applied. As a result, the burr 105 are reliably removed even in the portion where the parting line PL is inclined.

As the form of the burr 105, various other forms can be adopted. For example, since the burr 105 is soft unless cooled, it is preferable that the burr 105 is sufficiently cooled at the time of pressing by the press jig 102. In addition, it is preferable that the burr 105 has a standing wall than a simple sheet-like shape, because of higher strength. As a result, it is convenient for cutting by the press jig 102.

Figure 27:
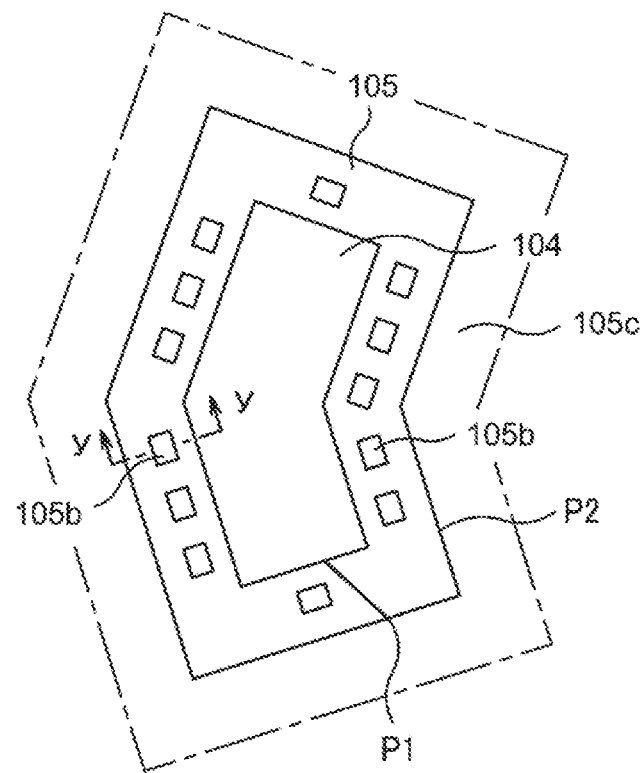
FIG. 27 is a schematic plan view showing a state in which convex portion (such as ribs) are formed on a burr.

In consideration of these matters, as shown in FIG. 27, it is also a preferable embodiment to form the convex portion 105b on the burr 105 around the molded body 104. By forming the convex portion 105b on the burr 105, the mechanical strength of the burr 105 is improved, and the burr 105 can be easily cut off by the press jig 102.

Figure 28:
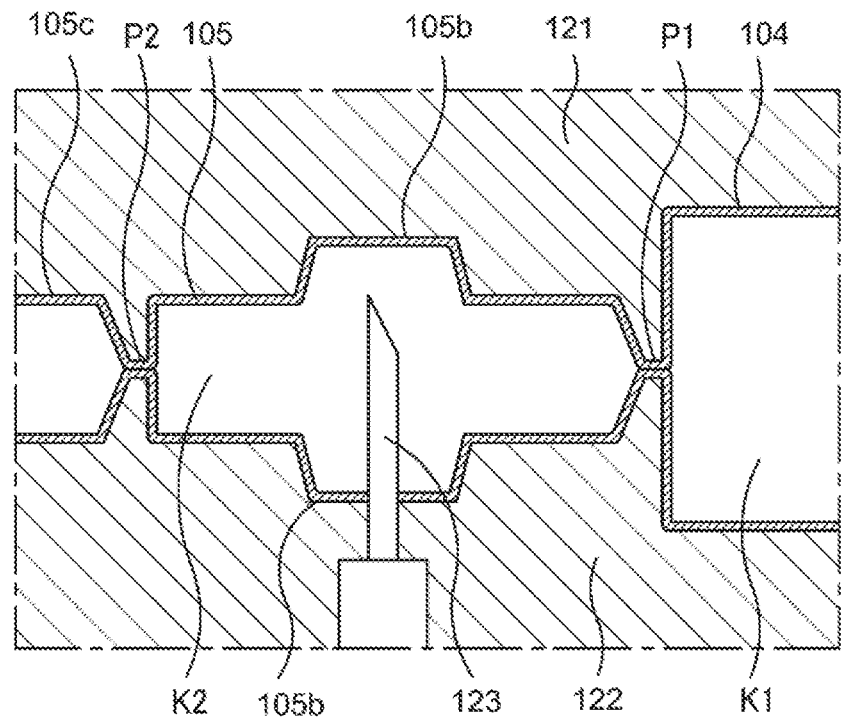
FIG. 28 is a schematic cross-sectional view showing a process of forming the convex portion shown in FIG. 27.

The formation of the convex portion 105b of the burr 105 can be performed in molds at the same time as the molding of the molded body 104. FIG. 28 shows a step of forming the burr 105. As shown in FIG. 28, the molded body 104 is molded by forming a parison in the cavity K1 of the molds 121 and 122. In molding the molded body 104, the parison at the outer peripheral portion of the cavity K1 is sandwiched between the molds 121 and 122 and crushed. In the crushing, the parison is crushed by the first pinch-off P1 and the second pinch-off P2, a parting line PL is formed on the outer peripheral portion of the molded body 104 by the first pinch-off P1, and an outer surplus portion 105c is formed by the second pinch-off P2.

In the example shown in FIG. 28, a space K2 is also formed in a portion of the molds 121 and 122 corresponding to the burr 105 (a portion between the first pinch-off P1 and the second pinch-off P2). Cooling and forming are performed at the same time by inserting the blow pins 123 while air blowing. That is, a space K2 is formed in a portion of the molds 121 and 122 corresponding to the burr 105, and when air blow is performing with the blow pins 123 are inserted into the space K2, the burr 105 comes into contact with the wall surfaces of the molds 121 and 122. Thereby cooling is promoted.

In addition, about the position where the blow pin 123 is inserted, it is preferable to widen the space K2 in order to increase the stroke of the blow pin 123. In this example, concave portions are formed in the molds 121 and 122 at the position where the blow pin 123 is inserted. Therefore, the burr 105 is formed according to the concave portion, and as a result, the convex portion 105b is formed on the burr 105. In the burr 105, a standing wall is formed by the formation of the convex portion 105b, and the mechanical strength is greatly improved.

By promoting the cooling of the burr 105 and improving the mechanical strength by forming the convex portion 105b as described above, the burr 105 of the molded body 104 taken out from the molds 121 and 122 has excellent rigidity, and can be easily punched by the press jig 102.

Figure 29:
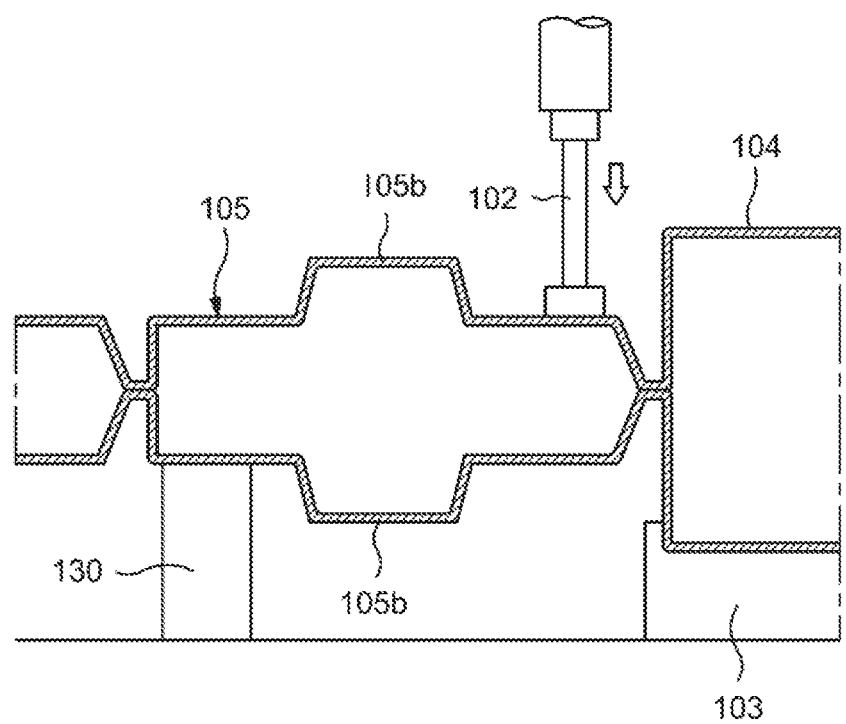
FIG. 29 is a schematic cross-sectional view showing a state in which a receiving base is provided outside the press jig to perform removing a burr.

When cutting off the burr 105 in such a form, it is preferable to set a receiving base outside the burr 105 and perform pressing by the press jig 102. FIG. 29 shows a burr removal step in which a receiving base is installed outside the burr 105. As described above, the molded body 104 provided with the convex portion 105b for sufficiently cooling the burr 105 and for improving the mechanical strength is taken out of the molds 121 and 122. Then the molded body 104 is placed on the receiving base 103 of the burr removal apparatus. Although there is no receiving base 103 below the burr 105, the receiving base 103 is also provided outside the position where the press jig 102 comes into contact (in this example, outside the convex portion 105b and inside the surplus portion 105c). Thereby the lower surface of the molded body 104 and the lower surface of the outer peripheral portion of the burr 105 are supported.

In this state, the burr 105 is pressed by the press jig 102 and cut off. By providing the receiving base 130 outside the contact position of the press jig 102, this becomes a fulcrum, and the force of the press jig 102 is effectively applied at the contact position of the press jig 102, which is the point of action. In addition, it is also advantageous that the burr 105 is easily removed by providing the receiving base 130 outside the contact position of the press jig 102.

The position of the receiving base 130 is outside the contact position of the press jig 102 as described above, and it is preferable that the receiving base 130 is outside the portion formed by the air blow of the burr 105. That is, it is outside the contact position of the press jig 102 and inside the second pinch-off P2. The surplus portion 105c outside the second pinch-off P2 is in a so-called free state, and does not function as a fulcrum even if supported by the receiving base 130. By supporting the vicinity of the inside of the second pinch-off P2 with the receiving base 130, a portion having a certain degree of rigidity is supported. As a result, the function as a fulcrum is effectively exhibited.

The second embodiment to which the present invention is applied has been described above. However, needless to say, the present invention is not limited to the above-described embodiment, and various changes can be made without departing from the gist of the present invention.

The invention claimed is:

1. A method for manufacturing a molded body, the method comprising the steps of:
    molding a molded body in molds, and
    separating a burr formed around the molded body, wherein
    the burr is separated from the molded body by, within the molds, cooling at least a part of the burr by air blow, and projecting at least one projecting member against the cooled burr.

2. The method of claim 1, wherein
the mold has a burr accommodating space accommodating the burr outside the pinch portion for pinching an outer peripheral portion of the molded body, wherein
cooling the burr and projecting the projecting member are performed in the burr accommodating space.

3. The method of claim 2, wherein
the mold is provided with an air discharge pin for discharging air from the burr accommodating space.

4. The method of claim 2, wherein
projecting the projecting member is performed in a state that there is a space between the burr and a mold surface opposite to the projecting member.

5. The method of claim 4, wherein
after the burr is pressed against the projecting member by air blow, the projecting member presses the burr toward the mold surface in order to separate burr from the molded body.

6. The method of claim 2, wherein
when the pinch portion is deemed to be a first pinch portion,
the mold has a second pinch portion outside the first pinch portion,
the burr accommodating space is provided between the first pinch portion and the second pinch portion.

7. The method of claim 2, wherein
the molded body includes adjacent two molded body portions,
the burr accommodating space is provided between the pinch portions of the adjacent two molded body portions in the molds.

8. The method of claim 1, wherein
the projecting member comprises plural rods.

9. The method of claim 4, wherein
the projecting member comprises plural rods.

10. A method for manufacturing a molded body, the method comprising the steps of:
    molding a molded body in molds, and
    separating a burr formed around the molded body, wherein
    the burr is separated from the molded body by, within the molds, cooling at least a part of the burr, and projecting at least one projecting member against the cooled burr, and
    the projecting member comprises plural rods,
    wherein each of the rods is installed with a tip slightly projected from a mold surface.

11. The method of claim 10, wherein
the mold has a burr accommodating space accommodating the burr outside the pinch portion for pinching an outer peripheral portion of the molded body, wherein
cooling the burr and projecting the projecting member are performed in the burr accommodating space.

12. The method of claim 11, wherein
projecting the projecting member is performed in a state that there is a space between the burr and a mold surface opposite to the projecting member.

13. The method of claim 12, wherein
the mold has an inclined surface toward the pinch portions in the burr accommodating space, and
projecting the projecting members against the burr near the pinch portion with the burr sandwiched between the molds at the tops of the inclined surfaces in order to separate the burr from the molded body.

14. The method of claim 11, wherein
the rods are arranged along the pinch portion.

15. The method of claim 10, wherein
each of the rods has a substantially circular concave portion or a substantially circular convex portion at a substantially center of a tip end surface of the projecting member.

16. The method of claim 10, wherein
each of the rods has a cross section having a circular outer shape.

17. A method for manufacturing a molded body, the method comprising the steps of:
    molding a molded body in molds, and
    separating a burr formed around the molded body, wherein
    the burr is separated from the molded body by, within the molds, cooling at least a part of the burr, and projecting at least one projecting member against the cooled burr, and
    the mold has a burr accommodating space accommodating the burr outside the pinch portion for pinching an outer peripheral portion of the molded body, wherein
    cooling the burr and projecting the projecting member are performed in the burr accommodating space,
    projecting the projecting member is performed in a state that there is a space between the burr and a mold surface opposite to the projecting member.

18. The method of claim 17, wherein
a volume of the burr accommodating space is larger than a volume of the burr accommodated in the burr accommodating space in a state before projecting the projecting member starts.

* * * * *